United States Patent
Gaal (10) Patent No.: US 6,895,249 B2
(45) Date of Patent: May 17, 2005

(54) METHOD AND APPARATUS FOR BROADCASTING POSITION LOCATION DATA IN A WIRELESS COMMUNICATION SYSTEM

(75) Inventor: Peter Gaal, San Diego, CA (US)

(73) Assignee: Qualcomm Incorporated, San Diego, CA (US)

(*) Notice: Subject to any disclaimer, the term of this patent is extended or adjusted under 35 U.S.C. 154(b) by 654 days.

(21) Appl. No.: 09/903,320

(22) Filed: Jul. 10, 2001

(65) Prior Publication Data

US 2002/0072378 A1 Jun. 13, 2002

Related U.S. Application Data

(60) Provisional application No. 60/218,322, filed on Jul. 14, 2000.

(51) Int. Cl.[7] .................................................. H04Q 7/20
(52) U.S. Cl. ............................. 455/456.1; 455/414.1; 455/414.2; 455/456.3; 342/357.01; 342/357.06
(58) Field of Search ........................... 455/3.01, 414.1, 455/414.2, 440, 456.1–457, 466; 370/312, 328; 342/357.01–357.17, 450–465

(56) References Cited

U.S. PATENT DOCUMENTS

| | | | | |
|---|---|---|---|---|
| 4,987,571 A | * | 1/1991 | Haymond et al. | 370/445 |
| 5,878,033 A | * | 3/1999 | Mouly | 370/312 |
| 6,246,336 B1 | * | 6/2001 | Hymel | 340/7.41 |
| 6,252,543 B1 | * | 6/2001 | Camp | 342/357.06 |
| 6,505,052 B1 | * | 1/2003 | Jou | 455/466 |
| 6,600,917 B1 | * | 7/2003 | Maupin | 455/414.1 |
| 6,606,502 B1 | * | 8/2003 | Chung Kam Chung et al. | 455/466 |

OTHER PUBLICATIONS

TIA/EIA Standard "Position determination service standard for dual mode spread spectrum systems" 11–99, pps 1–131.*

* cited by examiner

Primary Examiner—William Trost
Assistant Examiner—Stephen M Dagosta
(74) Attorney, Agent, or Firm—Philip Wadsworth; Bruce Greenhaus; Richard Bachand (57) ABSTRACT

Techniques to efficiently broadcast position location data (PLD) from a base station to a number of terminals. In one aspect, PLD messages are classified into groups, and each group is broadcast in a different manner. For example, a first group of messages for PLD related to the base station is broadcast in an unscheduled format, and a second group of messages for PLD related to GPS satellites is broadcast in a scheduled format. In another aspect, a schedule for the second group describes the specific PLD elements selected for broadcast, their broadcast order, and the specific time intervals of their broadcast. The schedule is valid for a particular scheduled time interval, and the scheduling table is broadcast multiple times during the scheduled time interval to allow the terminals to quickly retrieve the schedule and ascertain what PLD information is being broadcast and where to look for specific PLD elements.

27 Claims, 6 Drawing Sheets

METHOD AND APPARATUS FOR BROADCASTING POSITION LOCATION DATA IN A WIRELESS COMMUNICATION SYSTEM

RELATED APPLICATIONS

This application claims priority to U.S. Provisional Application No. 60/218,322, filed Jul. 14, 2000.

BACKGROUND

1. Field

The present invention relates generally to position determination, and more particularly to techniques for broadcasting position location data (PLD) in a wireless communication system.

BACKGROUND

A common means by which to locate a device is to determine the amount of time required for signals transmitted from multiple sources at known locations to reach the device. One system that provides signals from a plurality of transmitters at known locations is the well-known Global Positioning Satellite (GPS) system. Satellites in the GPS system are placed in precise orbits according to a GPS master plan. The locations of the GPS satellites can be identified by a number of different sets of information, some more accurate than others.

GPS satellites transmit a set of information, referred to as "Almanac", which includes less accurate information regarding the location of the satellites in a "constellation". Ground stations continuously monitor the GPS satellites to observe their variations in orbit. Once the precise locations of the satellites have been determined, the information is relayed back to the satellites. The satellites then transmit another set of information, referred to as "Ephemeris", which includes a higher accuracy version of the satellite orbits. Each satellite transmits the Almanac information for all satellites in the GPS system but the Ephemeris information only for itself.

The Almanac and Ephemeris are valid for a limited amount of time. The Almanac information is considered to be accurate to approximately three kilometers for approximately one week from the time the Almanac is transmitted. The Ephemeris provides information regarding the satellite orbit with an accuracy of approximately one meter for approximately two hours. The error in both the Almanac and Ephemeris grows as the information ages. Accordingly, the location of the satellites based on this information is less and less accurate as the Almanac and Ephemeris age, unless updated information is received at appropriate time intervals.

A GPS receiver can receive and/or store an Almanac that indicates where each of a number of satellites is located in the sky at a given moment. A more accurate location of a GPS satellite may be determined based on the Ephemeris and the time of day at which this information is available.

Newer generation wireless devices (e.g., cellular telephones) are able to perform position determination based on GPS satellites and/or terrestrial base stations. For position determination based on satellite transmissions, the estimated location of a device may not be accurate if information regarding accurate locations of the satellites is not available. Accurate satellite locations may be attained by receiving updates (continually or as necessary) from the satellites themselves or from an alternative source. Such alternative source may be a base station or a position determining equipment (PDE) in a wireless communication system, each of which may be equipped with a GPS receiver capable of attaining the required information from the GPS satellites.

The messaging of position location data between a base station and a terminal is standardized in TIA/EIA/IS-801, entitled "Position Determination Service Standard for Dual Mode Spread Spectrum Systems," Nov. 1, 1999 (referred to herein as the IS-801 standard), which is incorporated herein by reference. The IS-801 standard defines a communication model whereby IS-801 messages are transmitted point-to-point between the base station and terminal. A larger portion of the system resources may thus be required to transmit position location data from the base station to a number of terminals. Since system resources are typically limited for most wireless systems, these IS-801 messages may consume a significant portion of the available system resources.

There is therefore a need in the art for techniques to efficiently provide position location data (e.g., GPS Almanac and Ephemeris) to a number of terminals in a wireless communication system. This need is particularly acute when position determination is based on transmitters (e.g., GPS satellites) that move over time and accurate locations of such transmitters are known only upon receiving updates from the transmitters or an alternative source such as a base station.

SUMMARY

Aspects of the invention provide techniques to efficiently broadcast position location data (PLD) from a base station to a number of terminals. In one aspect, PLD messages used to convey different types of PLD information may be classified into two or more groups based on the characteristics of the information they carry, and each group may be are broadcast in a different manner. For example, a first group of PLD messages for PLD related to the base station (which generally has longer longevity) may be broadcast in an unscheduled format, and a second group of PLD messages for PLD related to GPS satellites (which generally has shorter longevity and is updated more frequently and at somewhat regular intervals) may be broadcast in a scheduled format.

In another aspect, a schedule for the second group of PLD messages may be formed and included in a scheduling table that is transmitted at predetermined times. The schedule describes the specific PLD elements selected for broadcast, their broadcast order, and the specific time intervals for their broadcast. Each PLD element is a unit of PLD information of a particular type (e.g., Almanac, Almanac Correction, or Ephemeris information) and for a particular transmitter (e.g., a GPS satellite). The schedule is valid for a particular scheduled time interval (e.g., 512 broadcast cycles, which is approximately 11 minutes). The scheduling table may be broadcast a number of times (e.g., every broadcast cycle or 1.28 sec) during the scheduled time interval to allow the terminals to quickly retrieve the schedule and ascertain what PLD information is being broadcast and where to look for specific PLD information element. Up to date PLD information is broadcast to the terminals even though the schedule may be updated less frequently for each scheduled time interval.

Various other details of the PLD broadcast techniques are described below. The invention further provides other methods and apparatus that implement various aspects, embodiments, and features of the invention, as described in further detail below.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein.

DETAILED DESCRIPTION

Figure 1:
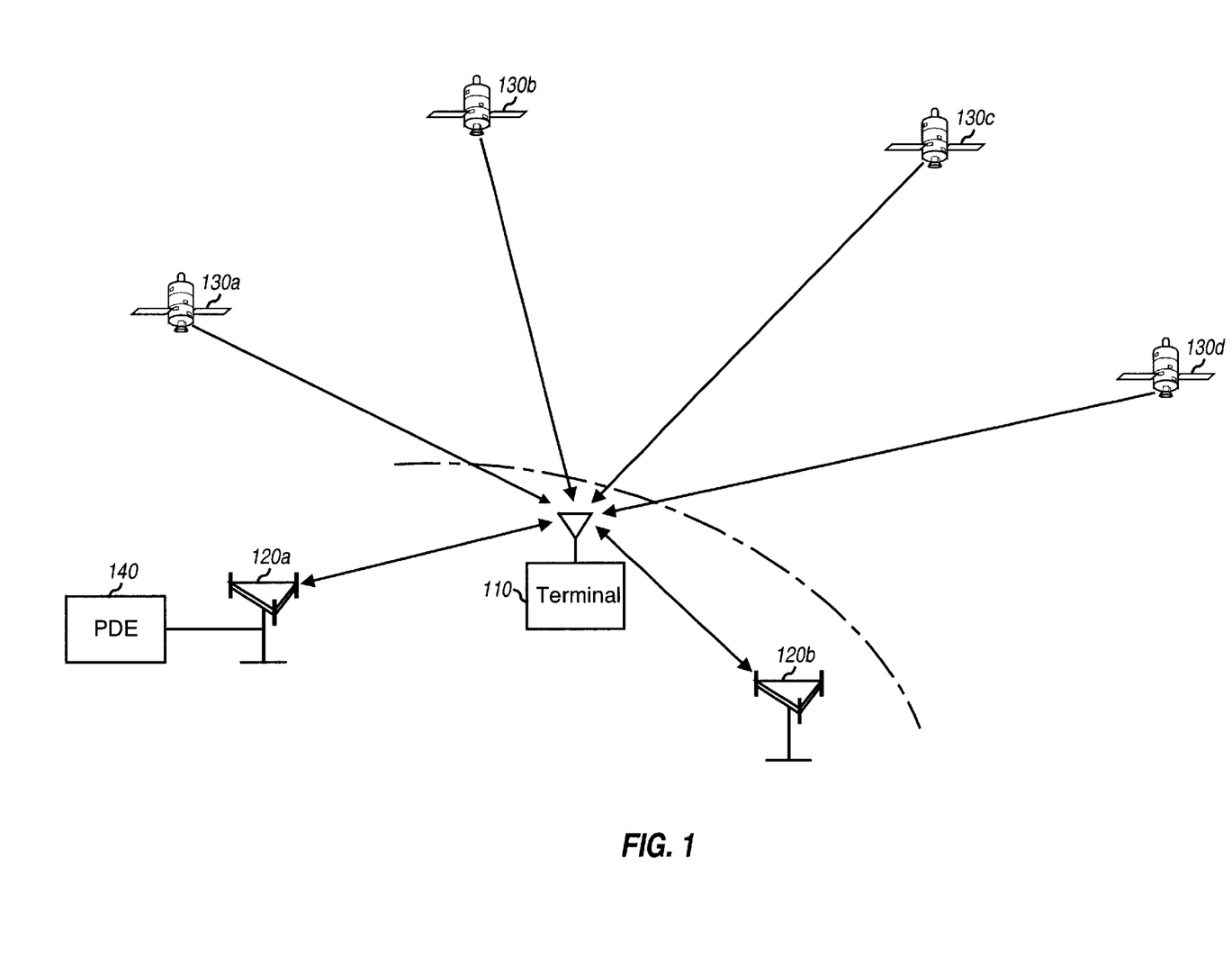
FIG. 1 is a simplified illustration of a system capable of implementing various aspects and embodiments of the invention.

FIG. 1 is a simplified illustration of a system capable of implementing various aspects and embodiments of the invention. A terminal 110 to be located receives signals transmitted from a number of transmitters, which may be base stations 120 of a wireless communication system and/or satellites 130 of a Global Positioning Satellite (GPS) system. In general, any type of transmitter having locations that are known or can be ascertained may be used for position determination.

Terminal 110 may be any device capable of determining the arrival times of received signals with respect to a reference time. In one embodiment, terminal 110 is a cellular telephone capable of receiving signals from a number of transmitters. In other embodiments, terminal 110 may be an electronics unit (e.g., a computer terminal, a personal digital assistance (PDA), and so on) having a wireless modem, a stand-alone GPS receiver, a receiver capable of receiving signals from satellites and base stations, or any other type of receiver.

The position of terminal 110 may be estimated based on signals received at the terminal (e.g., such as those transmitted from the GPS satellites and/or base stations) plus the locations of the transmitters from which the received signals originated. The position estimate of the terminal may be derived by the terminal, a Position Determining Equipment (PDE) 140 in the wireless communication system, a base station, or some other entity. The entity performing the position estimate is provided with the necessary measurements and the locations of the transmitters (or the means to determine these locations).

The locations of the GPS satellites may be ascertained by processing the signals transmitted by the satellites. Each satellite transmits "Almanac" information, which includes information regarding coarse locations of all satellites in the constellation. Each satellite further transmits "Ephemeris" information, which includes a higher accuracy version of its own orbit, as tracked and reported by tracking stations on earth. The locations of the base stations may also be made known (e.g., via messages) to the entity performing the position estimate for the terminal.

The GPS satellites and base stations may be used as reference points to determine the location of a terminal. By accurately measuring the distances to three transmitters at known locations, the terminal can "trilaterate" its position.

The terminal can estimate the distance to each transmitter by measuring the time required for a signal to travel from the transmitter to the terminal. If the time the signal is transmitted from the transmitter is known (e.g., stamped into the signal), then the travel time of the signal can be determined by observing the time the signal is received by the terminal (based on its internal clock). Typically however, the amount of time between transmission and reception cannot be exactly determined because of offsets in the clocks at the transmitter and terminal. Thus, a "pseudo-range" is typically obtained based on the difference between a reference time and the time that the signal is received.

To accurately estimate the position of a terminal, accurate range information as well as the transmitter locations are needed. As noted above, each GPS satellite transmits the Almanac information for all satellites in the GPS system and the Ephemeris information for only itself. If the terminal is required to obtain the satellite locations from the satellites themselves, then it may take a long time (e.g., 15 minutes) to arrive at a first "fix" (or position estimate) for the terminal since the satellite transmissions would need to be demodulated and recovered. Moreover, in certain instances, these satellite transmissions may be received at signal strengths too weak to recover the transmitted data but sufficient to estimate the signal arrival times.

As can be seen from the above, it is often advantageous to obtain the satellite locations from an alternative source, such as a base station in a wireless communication system. If provided with information for the satellite locations (e.g., from the base station), a terminal may be able to arrive at the first fix in a shorter time period since the transmissions from the GPS satellites do not need to be demodulated to recover this information. Moreover, the satellite location information received from the base station may even be used to assist in the detection of the transmissions from the GPS satellites, which may further improve performance. The information received from the base station may be used to obtain more accurate timing of the satellite transmissions.

The messaging of position location data (PLD) between the base station and terminal has been defined in the IS-801 standard. Even though IS-801 messages may be sent on common channels (used for all terminals) as well as on dedicated channels (assigned to specific terminals), the communication model defined by IS-801 is point-to-point. However, because of inherent redundancy in the contents of the position location messages, the overhead used for transmitting IS-801 messages may be reduced if parts of these contents are broadcast to all terminals. The set of broadcast position location messages may be designed to complement the full IS-801 protocol and to not eliminate any of the previously defined messages.

With the PLD broadcast messages described herein, backward compatibility may be preserved and a shorter time to first fix may be achieved in emergency situations. For example, a terminal may be powered down for a long time and most of the PLD stored in its memory may be stale. If the terminal is then turned on because a user wants to make a 911 call, then it may take the terminal a long time (e.g., 20–30 seconds) to collect the PLD from a broadcast channel, which may be unacceptable in an emergency situation. In this case, the terminal can request the PLD from the base station via a point-to-point transmission on a traffic channel and would then receive the PLD in a shorter time period (e.g., 1–2 seconds). This point-to-point transmission may be wasteful but, in an emergency situation, would be justified.

In an aspect, a subset of forward link response messages defined by IS-801 is selected for broadcast to the terminals. Table 1 lists the full set of IS-801 forward link response messages, the functions supported by the messages, and the approximate message sizes based on certain assumptions.

TABLE 1

| Message Type | Acquisition Assist | Sensitivity Assist | Location Assist | AFLT Assist | Length (octets) |
|---|---|---|---|---|---|
| 1 Reject | N | N | N | N | 1 |
| 2 Provide BS Capabilities | N | N | N | N | 2 |
| 3 Provide GPS Acquisition Assistance | Y | N | N | N | 90 |
| 4 Provide GPS Location Assistance-Spherical | Y | N | Y | Y | 86 |
| 5 Provide GPS Location Assistance-Cartesian | Y | N | Y | Y | 153 |
| 6 Provide GPS Sensitivity Assistance | N | Y | N | N | 784 |
| 7 Provide Base Station Almanac | N | N | N | Y | 88 |
| 8 Provide GPS Almanac | Y | Y | N | N | 517 |
| 9 Provide GPS Ephemeris | Y | Y | Y | N | 660 |
| 10 Provide GPS Navigation Message Bits | Y | Y | Y | N | 3236 |
| 11 Provide Location Response | N | N | N | N | 20 |
| 12 Provide GPS Almanac Correction | Y | N | Y | N | 152 |

AFLT (advanced forward link trilateration) is a position determination technique that uses the pilot signals transmitted on the forward link to determine the position of a terminal. These IS-801 messages and their uses are described in further detail in the IS-801 standard.

It is typically not practical to convey all information needed to satisfy all functions for all terminals on the broadcast channel since this would require a large overhead on the broadcast channel. Thus, in an embodiment, only a subset of the IS-801 messages is selected for broadcast to the terminals. The Reject and Provide Location Response messages are terminal specific and need not be broadcast. All other messages in Table 1, however, are candidates for broadcast.

A number of considerations may be taken into account in selecting which ones of the IS-801 messages to broadcast. The objective is to select messages that (1) are likely to convey the most information that is useful to the greatest number of terminals, (2) are relatively compact so as not to excessively increase the overhead, (3) have multiple purposes, i.e., support more than one function, and (4) have reasonable longevity so that the terminal can save battery life by not having to wake up too often to update its database. The determination of a message's usefulness may not be trivial because different terminals may operate in different operating modes (e.g., autonomous or base station assisted) and thus may utilize different sets of information.

The Provide BS Capabilities and Provide BS Almanac messages have great longevity and should be broadcast to the terminals. Other messages that are good candidates for broadcast include:

1. Provide GPS Acquisition Assistance. This message is very compact, but it does not support location assistance or sensitivity assistance. If a terminal is also provided with either location assistance or Ephemeris information, then this message becomes redundant.

2. Provide GPS Ephemeris. This message supports all receiver functions, i.e., it can be used for acquisition assistance, sensitivity assistance, and location assistance. The Ephemeris has relatively short life span and, at least for sensitivity assistance purposes, becomes outdated approximately every two hours, at which times the terminal would need to wake up and collect new data.

3. Provide GPS Almanac+Provide GPS Almanac Correction. Together, these messages support all receiver functions. The Almanac has a long life span but the Almanac Correction has a relatively short life span (when used for location assistance, it is valid for approximately 30 minutes if up to second order correction terms are included; and approximately 2.5 minutes if up to first order correction terms are included). However, the Almanac Correction information is compact.

4. Provide GPS Navigation Message Bits. This message contains all GPS information needed. However, the amount of data for this message may be excessive for the broadcast channel.

Various different sets of IS-801 messages may be selected for broadcast and are within the scope of the invention. For clarity, various aspects and embodiments of the invention are described below whereby the set of messages to be broadcast includes the Provide BS Capabilities, Provide Base Station Almanac, Provide GPS Almanac, Provide GPS Almanac Correction, and Provide GPS Ephemeris messages.

Table 2 lists the five IS-801 messages selected for broadcast to the terminals and some of their attributes. These IS-801 messages are also referred to herein as broadcast mode position location data (PLD) messages, or simply PLD messages. Each PLD message includes a specific type of information that may be used by the terminals for position determination and which is valid for a particular period of time.

TABLE 2

| Message Type | Approx. Valid Time | Number of Elements | Length of an Element (bits) | Total Length (octets) |
|---|---|---|---|---|
| 1 Provide BS Capabilities | 1 yr | 1 | 48–56 | 7 |
| 2 Provide Base Station Almanac | 1 mo | 12 | 24–64 | 56 |
| 3 Provide GPS Almanac | 1 wk | 27 | 192 | 648 |
| 4 Provide GPS Ephemeris | 2 hrs | 10 | 572 | 715 |
| 5 Provide GPS Almanac Correction | 30 mins | 10 | 107 | 134 |

Each message includes one or more PLD elements, with each element being a particular unit of information. For example, one element for the Base Station Almanac describes one sector, one element for the GPS Ephemeris includes three GPS sub-frames describing the Ephemeris for one satellite, and so on.

In the calculation of the length of the Provide Base Station Almanac message, three sectors per cell was assumed, which means that out of the 12 assumed neighbors, 4 have long location descriptor field and 8 have short location descriptor field. (In the Base Station Almanac message, there is a one-bit indicator that shows if the base station location data is the same as in the previous record.) For the Provide GPS Almanac Correction message, DELTA_XYZ_INCL=1 and DELTA_CLOCK_INCL=1 were assumed.

PLD Message Formats and Transmissions

In another aspect, the PLD messages are broadcast in different manners depending on their characteristics. To facilitate their broadcast, the PLD messages may be classified into two or more groups based on the information they carry. For example, the distinction between the various groups may be based on different longevity of the PLD information, the random or deterministic nature of the information updates, and so on. The PLD messages in each group may then be broadcast in a particular manner suitable for those messages.

In an embodiment, the PLD messages are classified into two groups. A first group of "Type I" messages comprises the first two messages listed in Table 2, and a second group of "Type II" messages comprises the remaining messages listed in Table 2. Type I messages are valid for a long time and their update times are not prescheduled. Thus, the broadcast of Type I messages needs not be scheduled. Type II messages are valid for shorter time periods, and their update intervals are known with some certainty and occur more frequently than those of Type I messages. Thus, in an embodiment, Type II messages are broadcast in a scheduled format.

The Type I and Type II messages may be defined to include various types of information that may be encapsulated using various formats. In general, it may be advantageous to adhere to the IS-801 message formats whenever possible in defining the PLD message formats. An example of the message contents and formats for some PLD messages are described below, and others may also be used and are within the scope of the invention. In an embodiment and as described below, the various types of information for all Type II messages may be encapsulated within and transmitted using a single message that is referred to as a GPS PLD message.

Figure 2A:
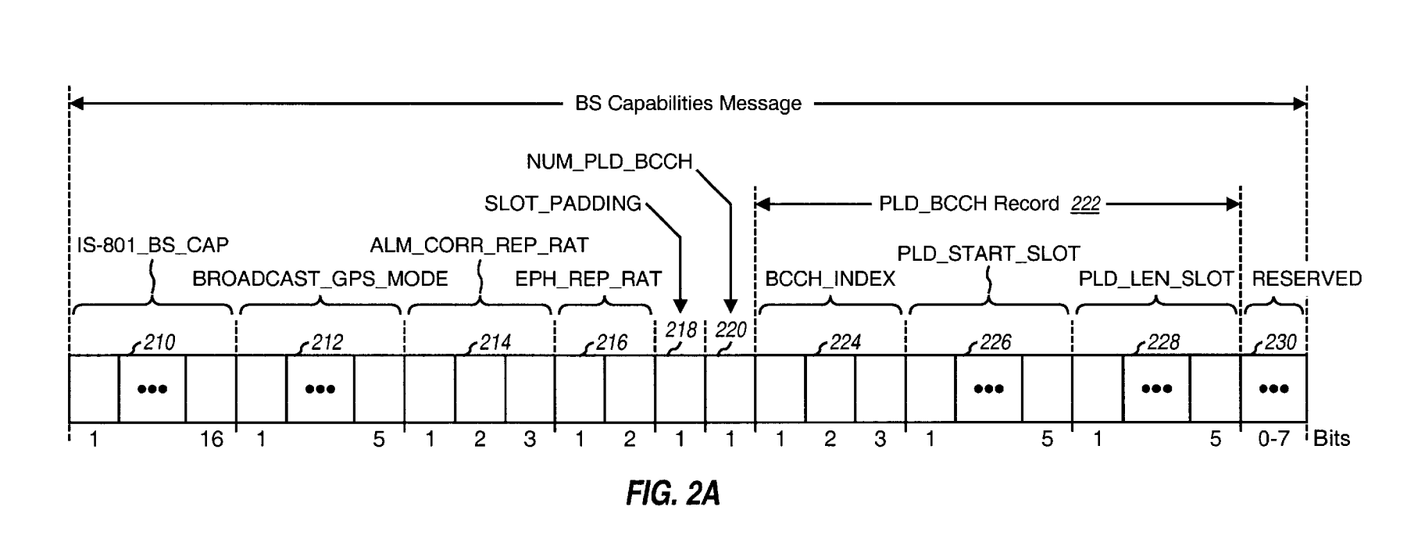
FIG. 2A shows a specific embodiment of a format for a Provide BS Capabilities message defined by IS-801 standard.

FIG. 2A shows a specific embodiment of a format for the Provide BS Capabilities message. This message format includes an IS-801_BS_CAP field 210 that includes the IS-801 base station capabilities information as described in the IS-801 standard, a BROADCAST_GPS_MODE field 212 that identifies the specific type(s) of position location data (e.g., Almanac, Almanac Correction, Ephemeris, or a combination thereof) being broadcast in the GPS PLD message. An ALM_CORR_REP_RAT field 214 identifies the number of Almanac Correction elements attached to each Almanac element (or page), and an EPH_REP_RAT field 216 identifies the number of Ephemeris elements attached to each Almanac element. A SLOT_PADDING field 218 denotes whether a PLD element may be transmitted across a slot boundary or needs to be transmitted within a slot, as described below.

A NUM_PLD_BCCH field 220 identifies the number of broadcast channels (BCCHs) to be used to transmit the GPS PLD message. In an embodiment, the GPS PLD message may be transmitted on one broadcast channel, or may be partitioned and transmitted on two broadcast channels. For each broadcast channel used to transmit the GPS PLD message, one PLD_BCCH record 222 is provided in the Provide BS Capabilities message to define the transmission format for the parts of the message being transmitted in that broadcast channel. Each PLD_BCCH record 222 includes a BCCH_INDEX field 224 that identifies the specific broadcast channel used to broadcast the PLD information, a PLD_START_SLOT field 226 that identifies a specific slot index where a PLD segment is scheduled to start, and a PLD_LEN_SLOT field 228 that identifies the length of a PLD segment (in units of slots). These various fields are described in further detail below. The broadcast channels may be defined, e.g., in the MC-RR Parameters Message defined by the IS-2000-4 standard, which is incorporated herein by reference. A RESERVED field 230 includes bits reserved for future use.

Table 3 lists the various fields of the Provide BS Capabilities message and their definitions.

TABLE 3

| Length (bits) | Fields |
|---|---|
| 16 | IS-801_BS_CAP<br>Contents as defined in IS-801 |
| 5 | BROADCAST_GPS_MODE<br>'00000' = Almanac pages only<br>'00001' = Almanac + Almanac Correction<br>'00010' = Almanac + Ephemeris<br>'00011' = Almanac + Almanac Correction + Ephemeris<br>All others = Reserved |
| 3 | ALM_CORR_REP_RAT<br>This field is included in the Provide BS Capabilities message if BROADCAST_GPS_MODE = '00001' or '00011';<br>(ALM_CORR_REP_RAT + 1) Almanac Correction elements are included in the GPS PLD message for each Almanac page. |

TABLE 3-continued

| Length (bits) | Fields |
|---|---|
| 2 | EPH_REP_RAT<br>This field is included in the Provide BS Capabilities message if BROADCAST_GPS_MODE = '00010' or '00011'; (EPH_REP_RAT + 1) Ephemeris elements are included in the GPS PLD message for each Almanac page. |
| 1 | SLOT_PADDING<br>0 = Padding disabled; break-up of PLD elements along slot boundaries is allowed<br>1 = Padding enabled; transmit entire PLD element within a slot |
| 1 | NUM_PLD_BCCH<br>0 = 1 BCCH (primary or not) is used for Type II messages<br>1 = 2 BCCHs (neither needs to be the primary) are used for Type II messages<br>PLD_BCCH records - (NUM_PLD_BCCH + 1) occurrences of the following sequence of three fields |
| 3 | BCCH_INDEX = identity of the broadcast channel to be used |
| 5 | PLD_START_SLOT = starting slot for the PLD segment |
| 5 | PLD_LEN_SLOT = length of the PLD segment |
| 0–7 | RESERVED |

In an embodiment, the Provide Base Station Almanac message is transmitted using the format defined by the IS-801 standard. The parameters PART_NUM and TOTAL_PARTS as defined in the IS-801 standard may be used to describe the partitioning of the Base Station Almanac message into segments suitable for transmission over multiple broadcast cycles, one segment for each broadcast cycle.

Type I messages have functions similar to those of the other overhead messages broadcast on the (primary) broadcast channel. In one transmission scheme for Type I messages, these Type I messages are incorporated into other overhead messages. More specifically, the Provide BS Capabilities message may be included as part of an ANSI-41 System Parameters Message, which already has a BROADCAST_GPS_ASST field. The Provide Base Station Almanac message may be part of a Universal Neighbor List Message, and may be included if the BROADCAST_GPS_ASST field is set to "1". Type I messages may thus be transmitted as overhead on the primary broadcast channel in a non-scheduled format.

In another transmission scheme for Type I messages, instead of augmenting the existing overhead messages, independent Type I messages are used and these messages may be broadcast on the (primary) broadcast channel along with the other overhead messages. A CONFIG_MSG_SEQ number and a QPCH Configuration Change Indicator as defined by the IS-2000-4 standard may be set to reflect changes in either of the Type I messages.

As noted above, PLD information for Type II messages may be encapsulated in a single GPS PLD message that is broadcast in a scheduled format. The scheduled transmission would allow the terminals to know when to wake up to collect the specific PLD information needed by these terminals. Various schemes may be used to broadcast the GPS PLD message in a scheduled format and are within the scope of the invention. Some of these schemes are described below.

In a first scheduled transmission scheme, a fixed schedule is used and the GPS PLD message is partitioned into a number of segments that are then transmitted over predetermined time intervals. Since the size of the GPS PLD message can vary depending on the number of PLD elements included in the message, which further depends on the number of satellites in view, padding, repetition, or some other mechanism may be used to facilitate the fixed scheduled transmission.

In a second scheduled transmission scheme, a scheduling table is transmitted at predetermined times and includes a schedule that identifies the specific PLD information being broadcast in the current GPS PLD message. In an embodiment, the scheduling table is transmitted in every broadcast cycle (e.g., every 1.28 sec in cdma2000) and at the start of a block of PLD information (i.e., a PLD segment) for that broadcast cycle. By recovering and examining the scheduling table, a terminal is able to determine what PLD information is being transmitted in the GPS PLD message and when each specific PLD information element is being transmitted. The scheduling table and its transmission are described in further detail below.

Figure 2B:
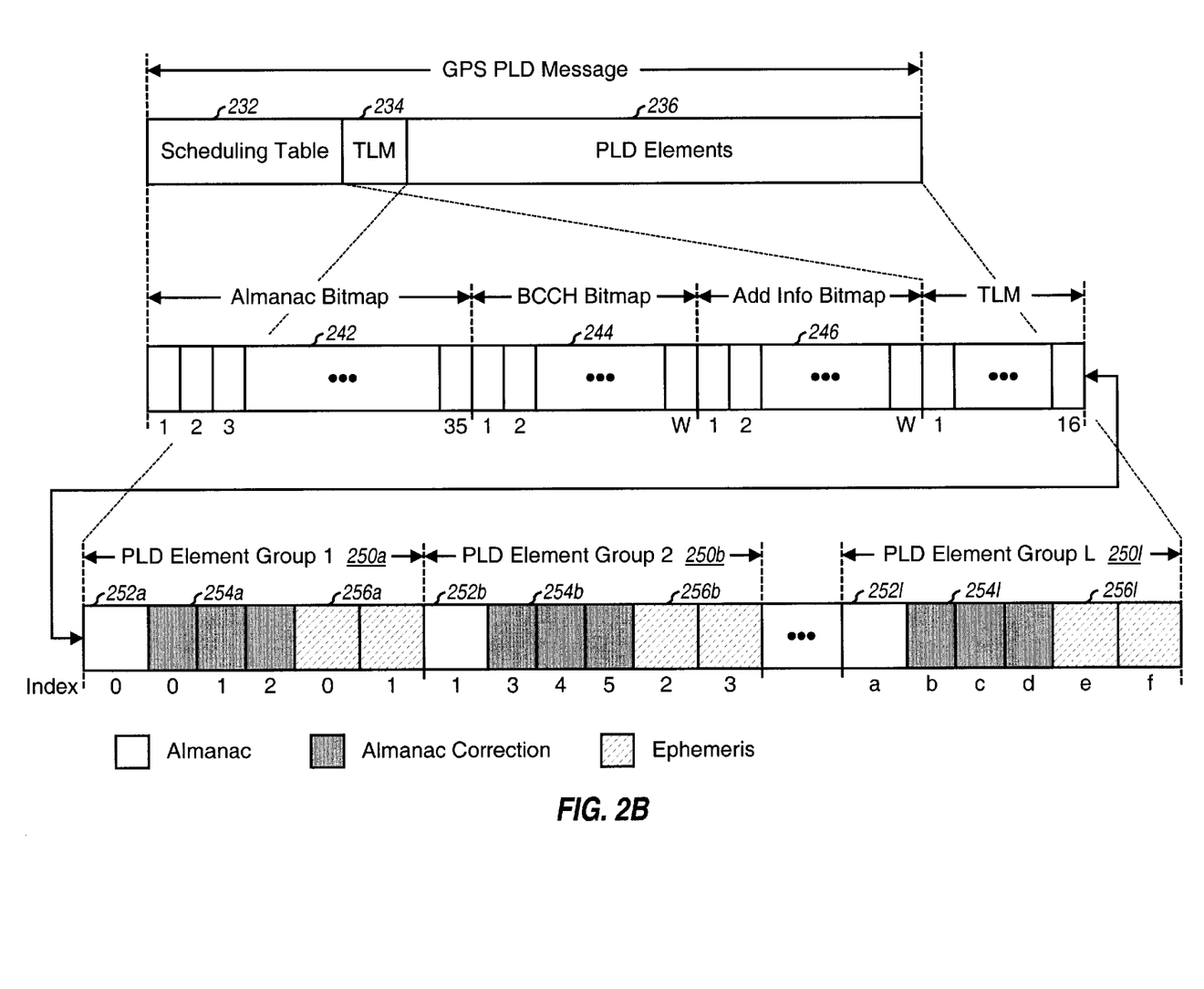
FIG. 2B shows a specific embodiment of a format for a GPS PLD message used to transmit various types of position location data (PLD) for GPS satellites.

FIG. 2B shows a specific embodiment of a format for the GPS PLD message. This message format includes (1) a scheduling table 232, (2) a TLM field 234 that describes a telemetry (TLM) word, and (3) a sequence 236 of one or more type-specific fields that include PLD elements assembled in a prescribed order. The GPS PLD message may be used to transmit information for all or a subset of the Type II messages.

The scheduling table describes a set of Almanac pages for a set of GPS satellites and possibly a set of Almanac Correction and/or Ephemeris elements associated with these Almanac pages. The specific additional information to be provided along with the Almanac pages (if any) is dependent on the value of the BROADCAST_GPS_MODE field in the Provide BS Capabilities message. In an embodiment, the PLD elements (e.g., Almanac, Almanac Correction, and Ephemeris elements) are transmitted in ascending order, based on a Page ID for the Almanac elements and a space vehicle (SV) ID for the Almanac Correction and Ephemeris elements. One full cycle of Almanac pages is included in a GPS PLD message, which is transmitted over an entire PLD cycle, as described below.

FIG. 2B also shows an embodiment of the scheduling table, which includes an Almanac bitmap 242, a BCCH bitmap 244, and an additional information bitmap 246. The detailed structure of the scheduling table may be, for example, as given in Table 4. Almanac bitmap 242 is used to transmit an ALM_PAGE_BIT_MAP field and includes 35 bits, one bit for each of the 32 possible GPS satellite PRN ID numbers in the constellation (typically, 24 GPS satellites plus spares are operational at any given moment, but there are 32 possible PRN ID numbers that can be assigned), and 1 bit each for the satellite health, satellite configuration and ionospheric data pages. Each bit in Almanac bitmap 242 is associated with a respective GPS satellite for which PLD information may be provided in the GPS PLD message. If a particular bit in Almanac bitmap 242 is set (to "1"), then the Almanac page for the GPS satellite associated with that bit is included in the GPS PLD message.

The Almanac elements selected for broadcast in the GPS PLD message are typically a subset of the operational GPS satellites chosen from a set of Sub-Frame 4 of Frames 2, 3, 4, 5, 7, 8, 9 and 10 and Sub-Frame 5 of Frames 1 through 24. Additionally, Sub-Frame 4 of Frames 18 and 25 and Sub-Frame 5 of Frame 25 are typically transmitted. The Almanac information for GPS satellites is described in further detail in a document entitled "Global Positioning System Standard Positioning Service Signal Specification," 2nd Edition, Jun. 2, 1995 (hereinafter referred to as the "GPS Signal Specification"), which is incorporated herein by reference. The Almanac Correction and Ephemeris elements selected for broadcast are typically the identical set of visible good health satellites situated above an elevation mask. In an embodiment, since the broadcast schedule is updated (i.e., changed) at predetermined scheduled time intervals (as described below), the elevation mask may be set lower for ascending satellites and higher for descending satellites. This may compensate for delayed changes in the broadcast schedule.

BCCH bitmap 244 is used to transmit an INDEX_BCCH field and is included in the PLD message if two broadcast channels are used to broadcast the GPS PLD message. If only one broadcast channel is used, then BCCH bitmap 244 can be eliminated. BCCH bitmap 244 includes one bit for each Almanac page included in the GPS PLD message, with each bit of BCCH bitmap 244 indicating whether that Almanac page and other PLD elements associated with the page are being broadcast on a first or a second broadcast channel (which are identified by the Provide BS Capabilities message). Since the number of Almanac pages included in the GPS PLD message is variable, the size of BCCH bitmap 244 is also variable and denoted as W.

In an embodiment, the PLD information for the GPS satellites is transmitted on alternating broadcast channels. For example, the PLD information for the first GPS satellite may be transmitted on the first broadcast channel, the PLD information for the second GPS satellite may be transmitted on the second broadcast channel, the PLD information for the third GPS satellite may be transmitted on the first broadcast channel, and so on. In another embodiment, if more than two broadcast channels are used to broadcast the PLD information, then each bit in BCCH bitmap 244 may be replaced with a field having more than one bit to identify the specific broadcast channel used to broadcast the PLD information.

Additional information bitmap 246 includes one bit for each Almanac page included in the GPS PLD message, and each bit of bitmap 246 indicates whether or not additional information associated with the Almanac page is also included in the GPS PLD message. The additional information may include Almanac Correction elements or Ephemeris elements or both, depending on the value of the BROADCAST_GPS_MODE field in the Provide BS Capabilities message. The number of additional elements included in the GPS PLD message is dependent on the values of the ALM_CORR_REP_RAT and EPH_REP_RAT fields in the Provide BS Capabilities message.

Table 4 lists various fields for the scheduling table. Transmission of the scheduling table is described in further detail below.

TABLE 4

| Length (bits) | Fields |
|---|---|
| 35 | ALM_PAGE_BIT_MAP<br>0 = The Almanac page corresponding to the Page ID is not included<br>1 = The Almanac page corresponding to the Page ID is included |
| (0–1)· | INDEX_BCCH - one bit for each '1' in the |
| W | ALM_PAGE_BIT_MAP (W ones total); this field is included if NUM_PLD_BCCH = 1<br>0 = The corresponding Almanac page and attached elements are broadcast on the first BCCH.<br>1 = The corresponding Almanac page and attached elements are broadcast on the second BCCH |
| W | ADD_ELMNTS_INCL - one bit for each '1' in the ALM_PAGE_BIT_MAP<br>0 = The satellite is below the elevation angle or is unhealthy. No other information elements are attached to the corresponding Almanac page.<br>1 = The satellite is above the elevation angle and is healthy. ALM_CORR_REP_RAT number of Almanac Correction elements are attached to the corresponding Almanac page if BROADCAST_GPS_MODE = '00001' or '00011'; and EPH_REP_RAT number of Ephemeris elements are attached to the corresponding Almanac page if BROADCAST_GPS_MODE = '00010' or '00011'; the Ephemeris elements are attached after the Almanac Correction elements (Note a) |
| 16 | TLM |

Notes:
(a) The ALM_PAGE_BIT_MAP and ADD_ELEMNTS_INCL fields together inform the receiver about the visible healthy satellites. Thus, even those receivers that are not capable of computing approximate satellite positions based on Almanac data can reduce their acquisition time.

FIG. 2B also shows an embodiment of various PLD elements that may be broadcast via the GPS PLD message. In an embodiment, the GPS PLD message may include various combinations of type-specific fields for Almanac information, Almanac Correction information, and Ephemeris information. In an embodiment, one group 250 of PLD elements is provided for each Almanac page to be broadcast, and the number of groups is determined by the number of ones in the ALM_PAGE_BIT_MAP field in the scheduling table. In another embodiment, the number of groups is greater than the number of ones in the ALM_PAGE_BIT_MAP field, and it is determined by the specified length of the PLD cycle.

Each PLD element group 250 includes an Almanac (ALMANAC_ELMNT) field 252, zero or more Almanac Correction (ALM_$_{1\ CORR}$_ELMNT) fields 254, and zero or more Ephemeris (EPHEMERIS_ELMNT) fields 256. Each Almanac field 252 is used to transmit one Almanac page for one GPS satellite. Each Almanac Correction field 254 is used to transmit one Almanac Correction element for the associated Almanac page, with the number of Almanac Correction elements being determined by the value of the ALM_CORR_REP_RAT field in the Provide BS Capabilities message. Similarly, each Ephemeris field 256 is used to transmit one Ephemeris element for the associated Almanac page, with the number of Ephemeris elements being determined by the value of the EPH_REP_RAT field in the Provide BS Capabilities message.

As shown in FIG. 2B, the elements in PLD element sequence 236 are interleaved such that each Almanac element 252 is followed by ALM_CORR_REP_RAT number of Almanac Correction elements 254 and EPH_REP_RAT number of Ephemeris elements 256. The Almanac Correction elements and the Ephemeris elements follow their own cyclical indexing, which form sub-cycles within a full PLD cycle for the GPS PLD message. At the start of the PLD cycle, all sub-cycles are reset (e.g., to zero, as shown in FIG. 2B), so that they start from the smallest Page ID and space vehicle ID.

If the PLD cycle is defined to have a particular maximum duration, then in certain instances the PLD cycle may not be sufficient to include an integer number of Almanac Correction and/or Ephemeris sub-cycles. In such instances, there is a skip in the sub-cycle indexing at the PLD cycle boundaries, which may increase the maximum wait time for the skipped PLD elements. To minimize this effect and to reduce the maximum wait time, the PLD cycle may be extended to a longer duration, e.g., up to the duration in which the scheduling table is valid (i.e., the scheduled time interval, which may be 512 broadcast cycles or approximately 11 minutes, as described below). In this case, the PLD cycle includes a number of Almanac element periods and skips in the cycle indexing only occur at each scheduled time interval.

Table 5 lists various fields for the Almanac, Almanac Correction, and Ephemeris elements in the PLD message.

TABLE 5

| Length (bits) | Fields | |
|---|---|---|
| 192 + (8 . . . 12) | ALMANAC_ELMNT | |
| 1 | | MOMENTUM_FLAG |
| 1 | | SYNC_FLAG |
| 190 | | ALM_BITS (words 3 . . . 9: 24 bits per word, word 10: 22 bits) |
| (Note a) | | SYMBOL VECTOR_BITMAP<br>0 = This Almanac page has not been uploaded yet to the SV that corresponds to this bit position. That SV transmits the preceding issue of this Almanac page.<br>1 = The SV corresponding to this bit position transmits the presented most recent issue of this Almanac page. |
| 155 | ALM_CORR_ELMNT | |
| 8 | | REF_TIME |
| 8 | | TOA (Note b) |
| 17 | | DELTA_X |
| 17 | | DELTA_Y |
| 17 | | DELTA_Z |
| 12 | | $DELTA\_X\_1^{ST}$ |
| 12 | | $DELTA\_Y\_1^{ST}$ |
| 12 | | $DELTA\_Z\_1^{ST}$ |
| 9 | | $DELTA\_X\_2^{ND}$ |
| 9 | | $DELTA\_Y\_2^{ND}$ |
| 9 | | $DELTA\_Z\_2^{ND}$ |
| 17 | | DELTA_CLOCK |
| 8 | | $DELTA\_CLOCK\_1^{ST}$ |
| 572 | EPHEMERIS_ELMNT | |
| 1 | | MOMENTUM_FLAG |
| 1 | | SYNC_FLAG |
| 570 | | EPH_BITS (sub-frames 1, 2, and 3; words 3 . . . 9: 24 bits per word, word 10: 22 bits) |

Notes:
(a) The number of bits for SV_BITMAP field is equal to the number of ones in the ADD_ELMNTS_INCL field of the scheduling table.
(b) The time of arrival (TOA) will be the same as in the last occurrence of the corresponding Almanac page. If two broadcast channels are used then the Almanac and Almanac Correction elements referring to the same Page ID will be on the same broadcast channel so that there is no ambiguity in the precedence.

The data to be included in the Almanac, Almanac Correction, and Ephemeris elements may be all or a subset of the data included in the Almanac and Ephemeris received from the GPS satellites. For example, the base station may extract some of the bits received from the GPS satellites and may further reformat these bits to form the PLD elements to be included in the GPS PLD message. A particular example may be when the PLD elements are exactly as specified in IS-801 or another appropriate standard. The formats of the Almanac and Ephemeris transmitted by the GPS satellites are described in the aforementioned GPS Signal Specification.

The PLD broadcast techniques described herein may be implemented in various wireless communication systems, including IS-95, cdma2000, and W-CDMA systems. For clarity, an example transmission scheme for the GPS PLD message is now described for the cdma2000 system.

Figure 3:
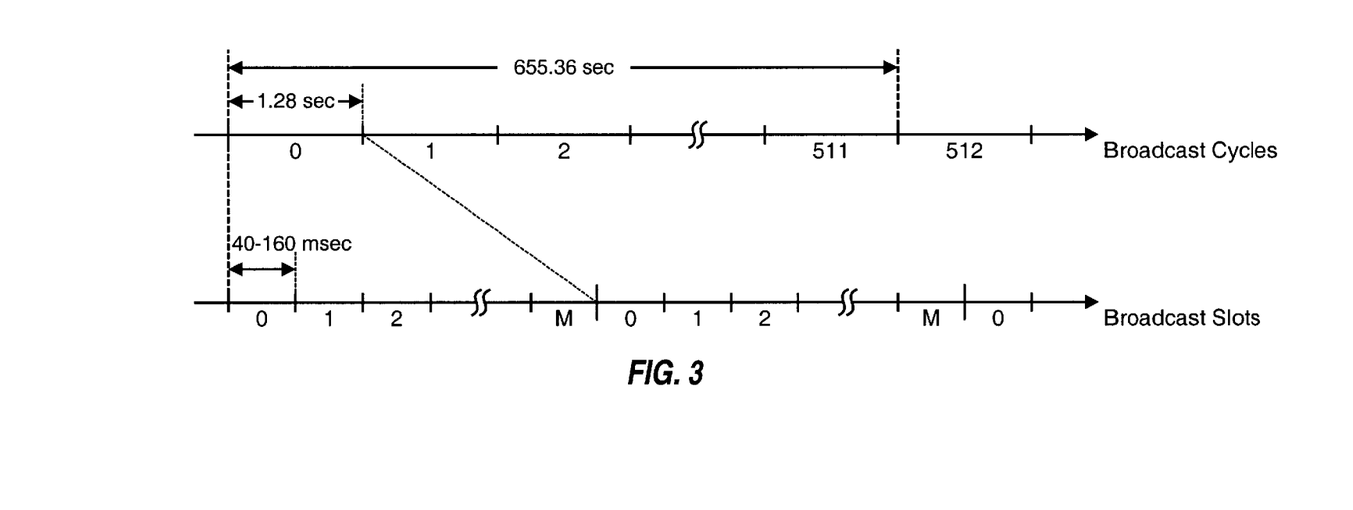
FIG. 3 is a diagram illustrating a broadcast channel frame structure for cdma2000.

FIG. 3 is a diagram illustrating a broadcast channel frame structure for cdma2000. The forward broadcast channel (F-BCH) supports transmission at one of three possible rates—4.8 kbps, 9.6 kbps, and 19.2 kbps. Each frame for the F-BCH includes 768 bits (i.e., 744 information bits, 16 CRC bits, and 8 code tail bits) and may be transmitted in one slot that spans 40 msec, 80 msec, or 160 msec depending on whether 19.2 kbps, 9.6 kbps, or 4.8 kbps, respectively, is used for the transmission. The transmission time on the F-BCH is further divided into broadcast cycles, with each broadcast cycle having a duration of 1.28 sec and including 8, 16, or 32 slots depending on the duration of the slot.

Figure 4:
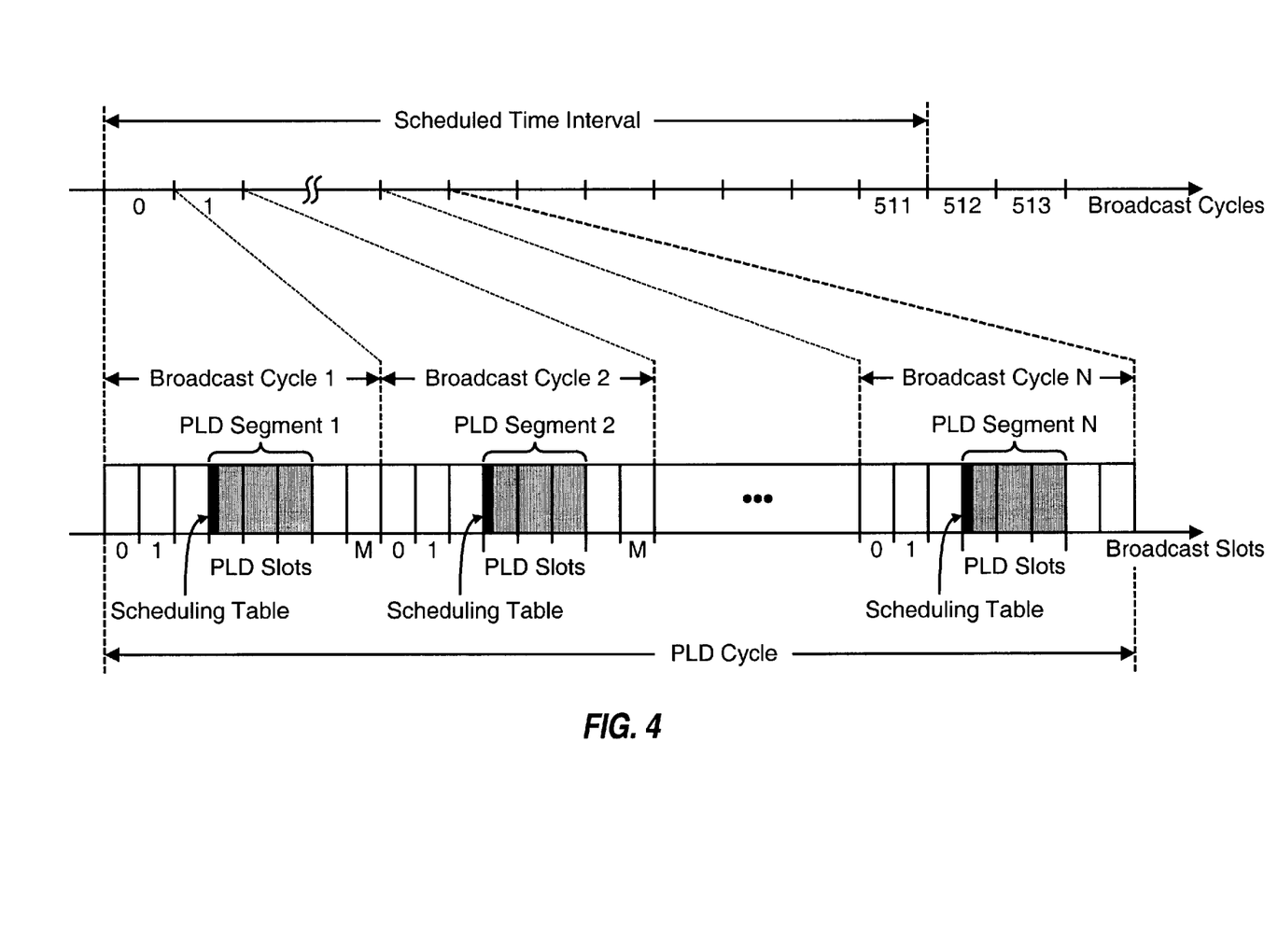
FIG. 4 is a diagram illustrating the transmission of a GPS PLD message, in accordance with an embodiment of the invention.

FIG. 4 is a diagram illustrating the transmission of a GPS PLD message, in accordance with an embodiment of the invention. The GPS PLD message includes the scheduling table, TLM, and sequence of PLD elements, as described above. Each GPS PLD message is associated with a respective scheduling table that describes a specific sequence of PLD elements included in the message. The scheduling table thus effectively defines the format of the GPS PLD message.

In an embodiment, the scheduling table is updated (i.e., allowed to change) at a predetermined scheduled time interval. As noted above, since the number of visible GPS satellites changes every 15 minutes on the average, the scheduled time interval may be selected to be shorter than this to ensure that the proper information can be broadcast to the terminals. In an embodiment, for cdma2000, the scheduled time interval is selected to be 512 broadcast cycles (i.e., 512·1.28 sec=655.36 sec≈11 min). Moreover, the start of each scheduled time interval is defined based on system time (i.e., CDMA time or an absolute reference time defined by the CDMA system). Since the terminals also have knowledge of system time, each terminal can determine whether or not its scheduling table is current and can further update its copy of the scheduling table if it is not current. Other scheduled time intervals may also be selected and are within the scope of the invention.

The scheduling table (which specifies the GPS PLD message format, i.e., the specific PLD elements included in the message and their ordering) is valid for the duration of the scheduled time interval, until the table is updated at the next interval. However, in an embodiment, up-to-date PLD information may be included in the GPS PLD message even though the scheduling table (and thus the message format) is maintained during the entire scheduled time interval. As each PLD element is prepared for broadcast, the current information for that element may be included in the GPS PLD message. In this way, the terminals may be provided with current information at all times.

The GPS PLD message has a variable length that depends on the number and types of PLD elements included in the message, as defined by the scheduling table. In an embodiment, the GPS PLD message is partitioned into one or more PLD segments that are transmitted over one or more broadcast cycles, one PLD segment for each broadcast cycle. In an embodiment, each PLD segment occupies an integer number of broadcast slots in the broadcast cycle used to transmit the segment, except for the last PLD segment, which may occupy a fraction of a slot. The broadcast slots used to transmit PLD information are referred to as PLD slots, with each PLD slot including 744 information bits.

In an embodiment, since the transmission time for the PLD message is typically shorter than the scheduled time interval, the PLD message is periodically repeated. Each PLD cycle covers the transmission time of a complete PLD message and comprises an integer number of broadcast cycles. In a specific implementation, the PLD cycle can range from 1 to 32 broadcast cycles (or 1.28 sec to 40.96 sec) and is dependent on the length of the GPS PLD message and the available throughput (i.e., the number of bit positions in each broadcast cycle available for transmission of the GPS PLD message). At the start of each scheduled time interval, a new PLD cycle is started with an updated scheduling table.

As shown in FIG. 4, the PLD segments of the PLD message are transmitted starting at the same slot index in all broadcast cycles used to transmit the message. This starting slot index is defined by the value of the PLD_START_SLOT field in the Provide BS Capabilities message, and can range from 0 to 7 for 4.8 kbps, 0 to 15 for 9.6 kbps, and 0 to 31 for 19.2 kbps. The length of each PLD segment is similarly defined by the value of the PLD_LEN_SLOT field in the Provide BS Capabilities message, and can range from 1 to 8 for 4.8 kbps, 1 to 16 for 9.6 kbps, and 1 to 32 for 19.2 kbps. The PLD segment length is the same for each broadcast cycle used to transmit the message, except for the last broadcast cycle of the PLD cycle, where the PLD message length may be shorter. For the example shown in FIG. 4, PLD_START_SLOT=3 and PLD_LEN_SLOT=2 (PLD segment length=PLD_LEN_SLOT+1).

In accordance with an aspect of the invention and as shown in FIG. 4, the scheduling table is transmitted periodically in each broadcast cycle and at the start of the PLD segment for that broadcast cycle. The same scheduling table is transmitted for each broadcast cycle in the scheduled time interval, but its periodic transmission allows the terminals to more quickly retrieve the scheduling information and determine what PLD information is being broadcast and where to look for any specific PLD information.

By retrieving the scheduling table, the terminal is able to ascertain the specific sequence of PLD elements being broadcast in the GPS PLD message. Since the PLD elements have fixed lengths that are known a prior and by knowing the values of the PLD_START_SLOT and PLD_LEN_SLOT fields, the terminal is able to calculate the length of the PLD cycle and the exact position of each PLD element in the GPS PLD message. Thus, the terminal may remain dormant or powered down for much of the time when not active and can wake up at the appropriate times to retrieve the needed PLD information.

In an embodiment, the scheduling table is transmitted only in the first broadcast channel used for PLD broadcast (e.g., the one listed first in the Provide BS Capabilities message) and can include scheduling information for both broadcast channels if two are used to transmit the GPS PLD message. This transmission scheme for the scheduling table reduces overhead.

In an embodiment, the TLM is also transmitted in each broadcast cycle (e.g., right after the scheduling table). The frequent broadcast of the TLM data ensures that the terminal may use 1.28 sec coherent integration soon after it is powered up, which may allow for an increase in receiver sensitivity, while maintaining short acquisition time.

In an embodiment, a cycle index is also transmitted in the first PLD slot of each broadcast cycle (e.g., immediately after the TLM). This cycle index identifies the position of the current broadcast cycle in the full PLD cycle, and has a value that ranges from 0 to (PLD cycle length-1) and may be computed by the terminal. By knowing the cycle index, the terminal can synchronize itself to the PLD cycle. The base station ensures that the PLD cycle does not exceed the maximum specified length (e.g., 32 broadcast cycles).

Figure 5A:
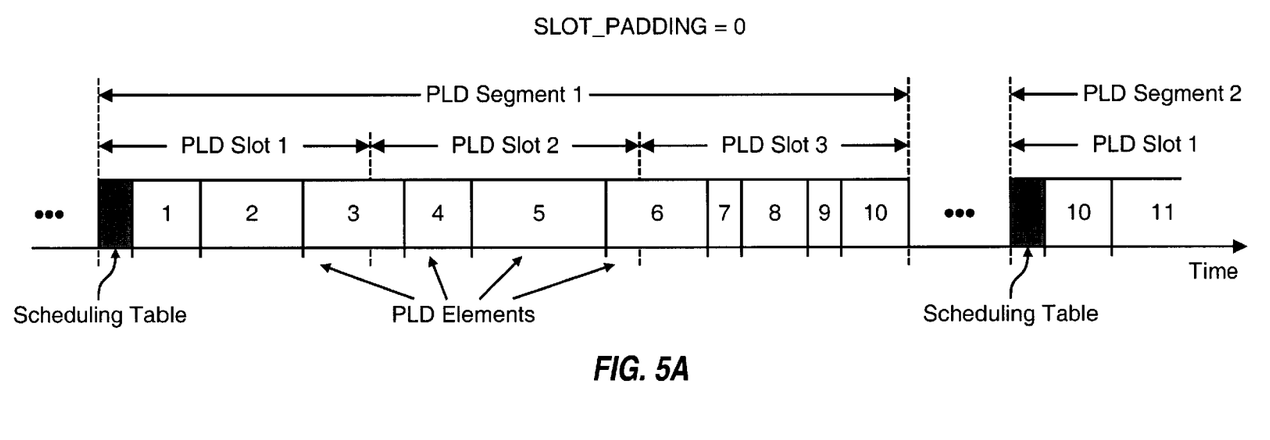
FIGS. 5A and 5B are diagrams illustrating the transmission of the GPS PLD message using two different slot-padding options.
Figure 5B:
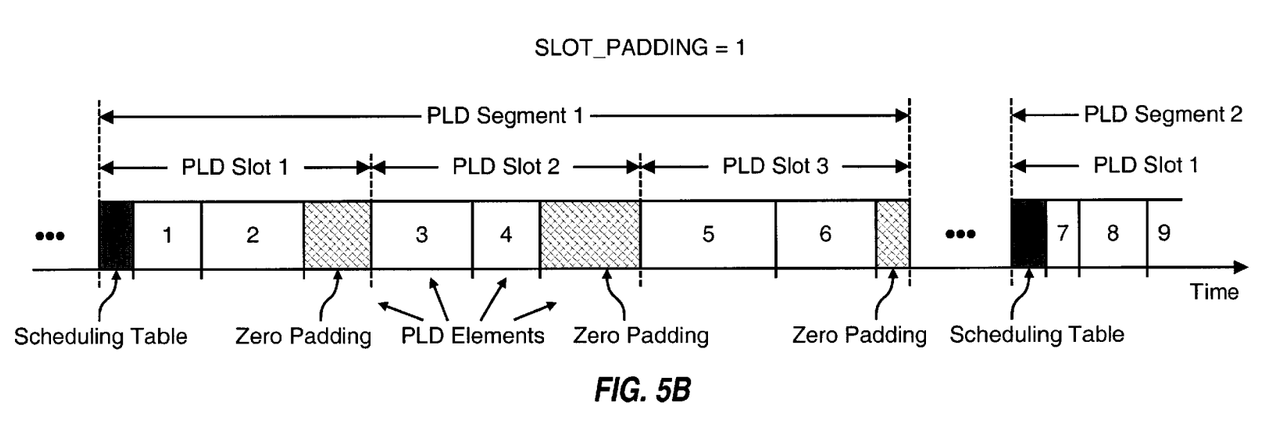

FIGS. 5A and 5B are diagrams illustrating the transmission of a GPS PLD message using two different slot-padding options. The PLD element sequence includes a number of PLD elements, with each element having a specifically defined length. These PLD elements may be transmitted over the available PLD slots using different transmission schemes.

FIG. 5A shows a PLD message transmission with no slot padding. For this transmission scheme, which corresponds to SLOT_PADDING=0 in the Provide BS Capabilities message, the PLD elements are transmitted in the available bit positions in the PLD slots and are allowed to break across slot and cycle boundaries. At the start of each PLD segment, the scheduling table and TLM are transmitted first, followed by the data for the remaining part of the GPS PLD message not transmitted in the previous PLD segment. This transmission scheme is more efficient since all bit positions are used to transmit PLD information.

FIG. 5B shows a PLD message transmission with slot padding. For this transmission scheme, which corresponds to SLOT_PADDING=1 in the Provide BS Capabilities message, complete PLD elements are transmitted in each PLD slot and are not allowed to break across slot boundaries. At the start of each PLD segment, the scheduling table and TLM are transmitted first, followed by one or more complete PLD elements for the remaining part of the GPS PLD message not transmitted in the previous PLD segment. A zero padding field with variable length is used to fill in any unused bits for each PLD slot. This transmission scheme may be easier to recover the PLD information since the PLD elements are not broken over slot and cycle boundaries.

System Design

Figure 6:
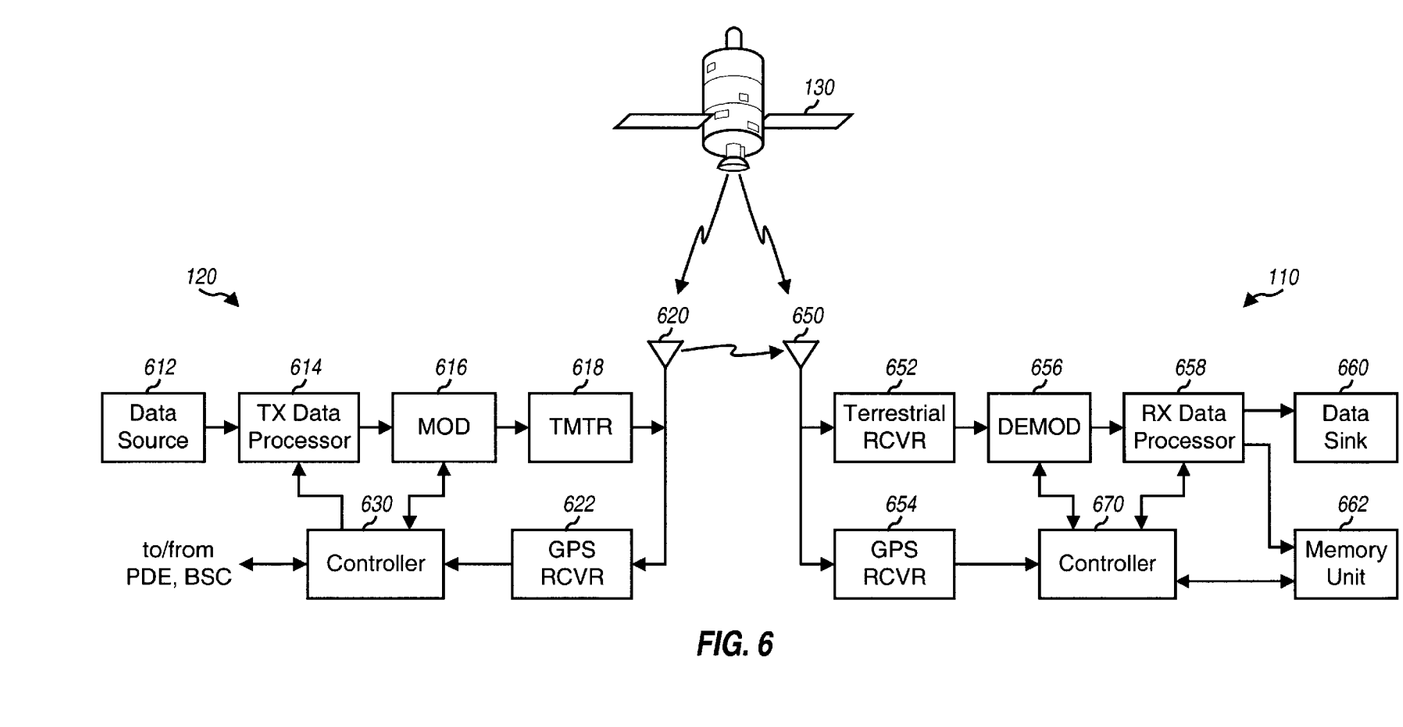
FIG. 6 is a simplified block diagram of an embodiment of a terminal and a base station.

FIG. 6 is a simplified block diagram of an embodiment of terminal 110 and base station 120, which are capable of implementing various aspects and embodiments of the invention. Terminal 110 and base station 120 may each receive transmissions from a number of GPS satellites 130 (only one satellite is shown in FIG. 6 for simplicity).

On the forward link, at base station 120, user-specific data, signaling, and position location data are provided by a data source 612 to a transmit (TX) data processor 614, which formats and encodes the different types of "traffics" based on one or more coding schemes to provide coded data. Each coding scheme may include any combination of cyclic redundancy check (CRC), convolutional, Turbo, block, and other coding, or no coding at all. Typically, each type of traffics is coded using a different scheme.

The coded data is then provided to a modulator (MOD) 616 and further processed to generate modulated data. The processing by modulator 616 may include (1) covering the coded data with orthogonal codes (e.g., Walsh codes, for cdma2000 system) to channelize the different types of traffics onto their respective dedicated and common channels and (2) spreading the covered data with short PN sequences at a specific offset assigned to the base station. As noted above, Type I messages may be transmitted on the primary broadcast channel, and Type II messages may be transmitted on one or two broadcast channels. The modulated data is then provided to a transmitter unit (TMTR) 618 and conditioned (e.g., converted to one or more analog signals, amplified, filtered, and quadrature modulated) to generate a forward modulated signal suitable for transmission via an antenna 620 and over a wireless link to the terminals.

At terminal 110, the forward modulated signal is received by an antenna 650 and provided to a terrestrial receiver unit (RCVR) 652. Receiver unit 652 conditions (e.g., filters, amplifies, downconverts, and digitizes) the received signal and provides samples. A demodulator (DEMOD) 656 then receives and processes the samples to provide recovered symbols. The processing by demodulator 656 includes despreading the samples with PN sequences aligned to the signal arrival time of the multipath being processed, decovering the despread samples to channelize the despread samples onto their respective dedicated and common channels, and (coherently) demodulating the decovered data with a recovered pilot. Demodulator 656 may implement a rake receiver that can process multiple instances of the received signal and combines symbols from various multipaths belonging to the same traffic to provide the recovered symbols.

A receive (RX) data processor 658 then decodes the symbols to recover the user-specific data, signaling, and position location data transmitted on the forward link. The recovered position location data may be stored to a memory unit 662 and/or provided to a controller 670, which may use this data for position determination. The processing by demodulator 656 and RX data processor 658 is complementary to that performed by modulator 616 and TX data processor 614 at base station 120, respectively.

As shown in FIG. 6, terminal 110 and base station 120 each includes a GPS receiver that may be used to receive and process the transmissions from the GPS satellites. Within base station 120, a GPS receiver 622 may be used to recover the Almanac, Almanac Correction, Ephemeris, and possibly other information from the received GPS transmissions and to provide the recovered information to a controller 630. Controller 230 selects PLD information for broadcast, schedules the broadcast, and includes the selected PLD information in the GPS PLD message to be broadcast to the terminals.

Within terminal 110, a GPS receiver 654 may similarly be used to receive and process the transmissions from the GPS satellites. However, since the Almanac, Almanac Correction, and Ephemeris information for GPS satellites may be obtained from base station 120, GPS receiver 654 may be designed and/or used to provide only the timing (e.g., the time or arrivals) for the received GPS transmissions. Controller 670 receives the timing and possibly other information from GPS receiver 654 and the PLD information from RX data processor 658 and/or memory unit 662, and estimates the position of terminal 110 based on the received timing and PLD information.

The elements of terminal 110 and base station 120 may be designed to implement various aspects of the invention, as described above. The elements of the terminal or base station may be implemented with a digital signal processor (DSP), an application specific integrated circuit (ASIC), a processor, a microprocessor, a controller, a microcontroller, a field programmable gate array (FPGA), a programmable logic device, other electronic units, or any combination thereof. Some of the functions and processing described herein may also be implemented with software executed on a processor. For example, the selection of the specific PLD information to broadcast, the scheduling of the transmission of Type II messages, and so on, may be performed by controller 630.

For clarity, various aspects and embodiments have been described specifically for an implementation in the cdma2000 system. The techniques described herein may also be used for any other communication systems where the broadcast of position location data may be advantageous.

Headings are included herein for reference and to aid in locating certain sections. These headings are not intended to limit the scope of the concepts described therein, and these concepts may have applicability in other sections throughout the entire specification.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. In a wireless communication system, a method for broadcasting position location data (PLD) from a base station to a plurality of terminals, comprising:

classifying a plurality of messages used to convey a plurality of types of PLD information into a plurality of groups based on one or more characteristics of the PLD information, wherein the plurality of groups include first and second groups, and wherein the PLD information for the messages in the first group has longer longevity than the PLD information for the messages in the second group;

selecting a particular transmission scheme for each group of messages; and broadcasting the messages in each group in accordance with the selected transmission scheme.

2. The method of claim 1, wherein the plurality of groups include a first group for PLD information related to the base station and a second group for PLD information related to satellites in a Global Positioning Satellite (GPS) system.

3. The method of claim 2, wherein the messages in the first group are broadcast using an unscheduled transmission scheme and the messages in the second group are broadcast using a scheduled transmission scheme.

4. The method of claim 2, further comprising:

encapsulating the PLD information for the messages in the second group into a composite message;

defining a schedule for broadcasting the composite message; and broadcasting the composite message in accordance with the defined schedule.

5. The method of claim 2, wherein each of at least one message in the first group is encapsulated within a predefined overhead message.

6. In a wireless communication system, a method for broadcasting position location data (PLD) from a base station to a plurality of terminals, comprising:

selecting one or more PLD elements for broadcast to the plurality of terminals, wherein each PLD element corresponds to a unit of PLD information of a particular type and for a particular transmitter;

defining a schedule for broadcasting the one or more selected PLD elements, wherein the schedule is valid for a particular scheduled time interval reater than 500 seconds;

forming a scheduling table representative of the defined schedule; and broadcasting the scheduling table and the one or more selected PLD elements to the plurality of terminals.

7. The method of claim 5, wherein the schedule is indicative of the one or more PLD elements selected for broadcast and their broadcast order.

8. The method of claim 7, wherein the schedule is further indicative of specific time intervals over which the scheduling table and the one or more selected PLD elements are broadcast.

9. The method of claim 7, wherein the schedule is further indicative of one or more broadcast channels used to broadcast the scheduling table and the one or more selected PLD elements.

10. The method of claim 6, wherein the scheduling table is broadcast a plurality of times during the scheduled time interval.

11. The method of claim 6, wherein the scheduling table is broadcast a plurality of times at periodic time intervals during the scheduled time interval.

12. The method of claim 6, wherein the scheduling table and the one or more selected PLD elements are broadcast within a PLD cycle of a particular time duration, and wherein the PLD cycle is repeated a plurality of times during the scheduled time interval.

13. The method of claim 6, wherein the transmitter is a satellite in a Global Positioning Satellite (GPS) system.

14. The method of claim 13, wherein the one or more selected PLD elements comprise Almanac information for one or more GPS satellites.

15. The method of claim 13, wherein the one or more selected PLD elements comprise Almanac Correction information for one or more GPS satellites.

16. The method of claim 13, wherein the one or more selected PLD elements comprise Ephemeris information for one or more GPS satellites.

17. In a wireless communication system, a method for broadcasting position location data (PLD) from a base station to a plurality of terminals, comprising;

selecting one or more PLD elements for broadcast to the plurality of terminals, wherein each PLD element corresponds to a unit of PLD information of a particular type and for a particular transmitter;

defining a schedule for broadcasting the one or more selected PLD elements;

forming a scheduling table representative of the defined schedule;

encapsulating the scheduling table and the one or more selected PLD elements into a composite message; and broadcasting the composite message in accordance with the defined schedule.

18. The method of claim 17, further comprising:

partitioning the scheduling table and the one or more selected PLD elements into one or more PLD segments; and broadcasting each PLD segment in a respective broadcast cycle of a particular time duration.

19. The method of claim 18, wherein each PLD segment includes the scheduling table.

20. The method of claim 18, wherein each PLD segment is broadcast over a particular time interval in the broadcast cycle.

21. The method of claim 20, wherein a starting time and a duration of the particular time interval are defined by the schedule.

22. The method of claim 17, wherein the wireless communication system is a CDMA system.

23. The method of claim 22, wherein the CDMA system implements cdma2000 standard.

24. The method of claim 22, wherein transmission time for one or more broadcast channels used to broadcast the scheduling table and the one or more selected PLD elements is partitioned into broadcast cycles and each broadcast cycle is further partitioned into a plurality of slots, wherein the scheduling table and the one or more selected PLD elements are partitioned into one or more PLD segments, and wherein each PLD segment is broadcast over one or more slots of one broadcast cycle.

25. The method of claim 24, wherein each PLD segment is broadcast starting at a particular slot index.

26. A base station in a wireless communication system, comprising:

a controller operative to select one or more PLD elements for broadcast, wherein each PLD element corresponds to a unit of PLD information of a particular type and for a particular transmitter, define a schedule for broadcasting the one or more selected PLD elements, and forming a scheduling table representative of the defined schedule; and a transmit data processor coupled to the controller and operative to process the scheduling table and the one or more selected PLD elements for broadcast to the plurality of terminals;

wherein the schedule is indicative of the one or more selected PLD elements, their broadcast order, and specific time intervals for their broadcast, and wherein the schedule is valid for a particular scheduled time interval and the scheduling table is broadcast a plurality of times during the scheduled time interval.

27. The base station of claim 26, wherein the transmitter is a satellite in a Global Positioning Satellite (GPS) system, and wherein the one or more selected PLD elements comprise Almanac information, Almanac Correction information, Ephemeris information, or a combination thereof for one or more GPS satellites.

* * * * *

UNITED STATES PATENT AND TRADEMARK OFFICE
CERTIFICATE OF CORRECTION

PATENT NO. : 6,895,249 B2
APPLICATION NO. : 09/903320
DATED : May 17, 2005
INVENTOR(S) : Gaal It is certified that error appears in the above-identified patent and that said Letters Patent is hereby corrected as shown below:

Column 18, line 37-38, change "pre-defmed" to --predefined--.

Column 18, line 48, change "reater" to --greater--.

Column 18, line 54, change "claim 5" to --claim 6--.

Column 19, line 2, change "pluraility" to --plurality--.

Column 20, line 7, change "edma2000" to --cdma2000--.

Signed and Sealed this

Eleventh Day of July, 2006

JON W. DUDAS
*Director of the United States Patent and Trademark Office*